United States Patent [19]

Hara et al.

[11] Patent Number: 4,941,794
[45] Date of Patent: Jul. 17, 1990

[54] AUTOMATED LOADING/UNLOADING EQUIPMENT

[75] Inventors: Yoshimasa Hara, Kawagoe; Seisaku Ohkura, Tsurugashima; Fumio Iijima, Sayama; Isamu Tamura, Tokikawa; Tetsuro Fukai, Sayama; Sumiho Tagiri; Norimasa Takagi, both of Toda, all of Japan

[73] Assignees: Honda Giken Kogyo Kabushiki Kaisha; Nittsu Shoji Kabushiki Kaisha, both of Tokyo, Japan

[21] Appl. No.: 442,454

[22] Filed: Nov. 30, 1989

Related U.S. Application Data

[63] Continuation-in-part of Ser. No. 166,557, Mar. 10, 1988, abandoned.

[30] Foreign Application Priority Data

Mar. 11, 1987 [JP] Japan .................................. 62-57698
Mar. 11, 1987 [JP] Japan .................................. 62-57699

[51] Int. Cl.$^5$ .............................................. B65G 67/02
[52] U.S. Cl. ........................................ 414/341; 104/37; 180/2.1; 280/43.12; 414/275; 414/391; 414/401
[58] Field of Search ............... 414/340, 341, 347, 349, 414/351, 389, 390, 391, 396, 274, 275; 180/2.1, 167, 274, 279; 280/43.12; 293/128; 104/35, 37, 44, 243, 245, 247

[56] References Cited

U.S. PATENT DOCUMENTS

| | | |
|---|---|---|
| 539,257 | 5/1895 | Fulton .................................. 414/340 |
| 2,833,435 | 5/1958 | Levy .................................. 180/2.1 X |
| 3,246,713 | 4/1966 | Nichols .......................... 280/43.12 X |
| 3,695,377 | 10/1972 | Ito et al. .......................... 180/2.1 X |
| 3,805,981 | 4/1974 | Christensen ......................... 414/697 |
| 3,814,456 | 6/1974 | Bryntse ............................. 280/43.12 |
| 3,834,667 | 9/1974 | Sanger .......................... 280/43.12 X |
| 3,836,031 | 9/1974 | Weisker et al. ...................... 414/668 |
| 3,850,111 | 11/1974 | Hansen ............................. 293/128 X |
| 3,854,748 | 12/1974 | Goodacre ........................ 280/43.12 |
| 4,103,795 | 8/1978 | Miller ........................... 280/43.12 X |
| 4,249,854 | 2/1981 | Teti ..................................... 414/685 |
| 4,252,495 | 2/1981 | Cook ............................ 280/43.12 X |
| 4,289,442 | 9/1981 | Stevens ............................... 414/629 |
| 4,298,305 | 11/1981 | Neth ................................. 104/37 X |
| 4,415,302 | 11/1983 | Brouwer et al. ...................... 414/417 |
| 4,496,274 | 1/1985 | Pipes .................................. 414/340 |
| 4,505,630 | 3/1985 | Kaschner et al. ............... 414/284 X |
| 4,597,334 | 7/1986 | Jacoby ................................... 104/37 |
| 4,601,480 | 7/1986 | Arwidsson et al. .............. 280/43.12 |
| 4,714,399 | 12/1987 | Olson .............................. 414/275 X |

FOREIGN PATENT DOCUMENTS

| | | |
|---|---|---|
| 3432312 | 10/1955 | Fed. Rep. of Germany . |
| 1530479 | 10/1969 | Fed. Rep. of Germany . |
| 2212292 | 11/1972 | Fed. Rep. of Germany . |
| 2610070 | 9/1977 | Fed. Rep. of Germany . |
| 3106027 | 9/1982 | Fed. Rep. of Germany . |
| 3115936 | 11/1982 | Fed. Rep. of Germany . |
| 3132899 | 3/1983 | Fed. Rep. of Germany . |
| 3132703 | 4/1983 | Fed. Rep. of Germany . |
| 2542715 | 9/1954 | France . |

(List continued on next page.)

Primary Examiner—David A. Bucci
Attorney, Agent, or Firm—Oblon, Spivak, McClelland, Maier & Neustadt

[57] ABSTRACT

As automated loading/unloading system is shown, which uses a lift truck 10 for loading and unloading cargos and adpated to travel between a container 90 and a coneyor 50, a rotatably disposed turntable 60 for rotation about a vertical axis, the turntable being rotated when the lift truck 10 is on top thereof so as to turn the lift truck to face the container 90 or conveyor 50. A transport passage 80 installed between the turntable 60 and container 90 to permit the lift truck 10 to reach the container 90. An external power unit 100 is employed for controlling the lift truck and the turntable 60. Guide rails 70 and 81 are provided to extend along the turntable 60 and the transport passage 80 along one edge. The lift truck 10 is designed so as to urge its body to one side in its movement so that the movement of the lift truck is guided by the rails 70 and 81 and the inside wall of the container on the same side of the rails.

3 Claims, 17 Drawing Sheets

FOREIGN PATENT DOCUMENTS

| | | |
|---|---|---|
| 2320897 | 3/1977 | France . |
| 2526778 | 11/1983 | France . |
| 2540479 | 8/1984 | France . |
| 2542724 | 9/1984 | France . |
| 254527 | 10/1984 | France . |
| 85153 | 7/1976 | Japan . |
| 41365 | 3/1977 | Japan . |
| 20261 | 2/1978 | Japan ................................. 414/275 |
| 113028 | 7/1983 | Japan ................................. 104/37 |
| 157138 | 7/1987 | Japan ................................. 414/398 |
| 1143679 | 3/1985 | U.S.S.R. ............................ 414/390 |
| 995647 | 6/1967 | United Kingdom . |
| 1081511 | 8/1967 | United Kingdom . |
| 1082138 | 9/1967 | United Kingdom . |
| 1317532 | 5/1973 | United Kingdom . |
| 1344187 | 1/1974 | United Kingdom . |
| 1440062 | 6/1976 | United Kingdom . |
| 1453387 | 10/1976 | United Kingdom . |
| 1515712 | 6/1978 | United Kingdom . |
| 1553292 | 9/1979 | United Kingdom . |
| 1553401 | 9/1979 | United Kingdom . |
| 2023097 | 12/1979 | United Kingdom . |
| 1566537 | 4/1980 | United Kingdom . |
| 2121759 | 1/1984 | United Kingdom . |
| 2123787 | 2/1984 | United Kingdom . |

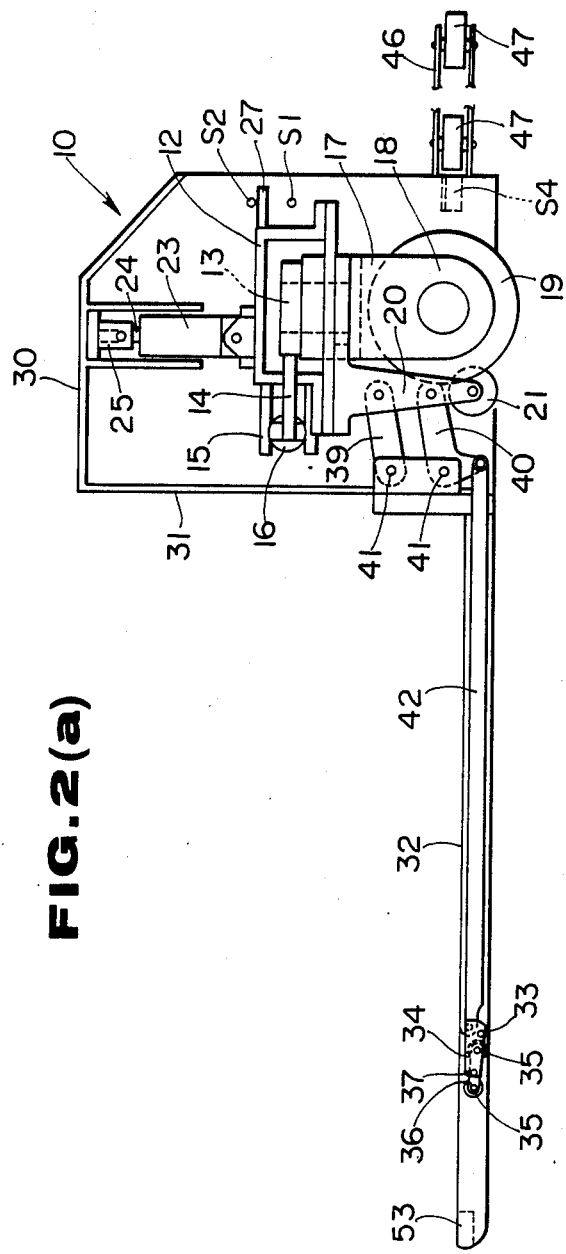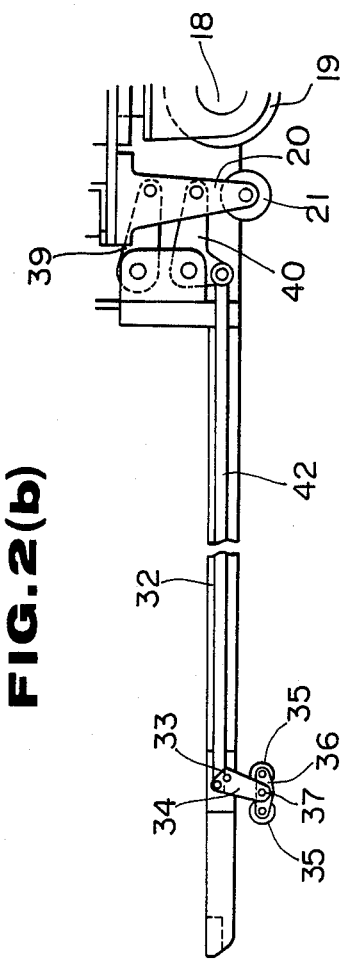
FIG.2(a)
FIG.2(b)

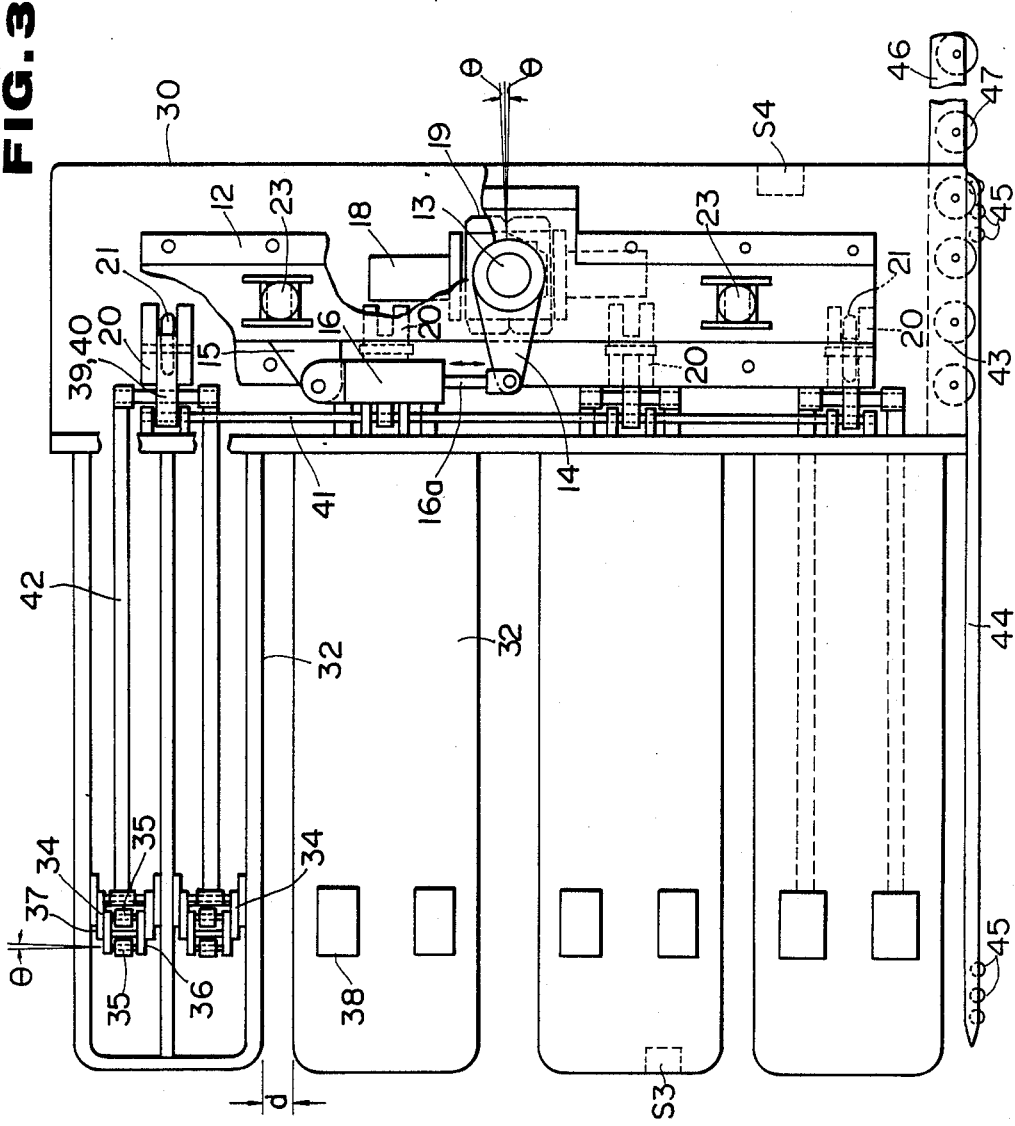

AUTOMATED LOADING/UNLOADING EQUIPMENT

This is a continuation of U.S. patent application Ser. No. 07/166,557 (now abandoned) which was filed on Mar. 10, 1988.

BACKGROUND OF THE INVENTION

1. Field of the Invention

The present invention relates to an automated system for loading or unloading cargo from a container or a trailer.

2. Description of the Prior Art

Various types of loading/unloading systems have so far been proposed as disclosed in U.S. Pat. Nos. 4,252,495 and 4,289,442 and British Patents Nos. 1,440,062, 1,453,387 and 2,023,097. In these prior art systems, the cargo, which may generally be crated or packed in cases of equal size, is put on a self-advancing pallette trucks, and handled as it is laid on such pallette trucks when moved from or into a container or a trailer car by lift trucks at the shipping station of a port warehouse or a factory. The forks of a lift truck are raised to level flush with the floor of the container or trailer so as to pass over or receive the pallette, with cases of cargo on, from it.

These conventional loading/unloading systems are advantageous when the container or trailer car is large enough to ease handling of cargo by a lift truck particularly when the cargo is guided into or from the entrance of the container or trailer.

However, these prior art systems have been found to pose various problems. First, particularly when the cargo on a pallette truck is loaded from a lift truck into a trailer or a container of medium or small size, considerable effort and care is required to guide and stop the lift truck at a loading point in front of the container or trailer entrance that the pallette from the lift truck can be steered into the container or trailer inside without striking against the side walls or previously loaded cargos, because of inability on the part of the lift truck driver to grasp the exact location of the pallette truck relative to the surrounding once it is let off from the lift truck.

Secondly, when the cargo is a large number of cases, cumbursome labor and wide floor space are required since the lift truck has to be turned around after each loading or unloading operation to move back to the unloading or reloading point from the container or trailer.

Furthermore, as the cargo is handled on a pallette truck, a large lift truck is required to load into or unload from a wide breadth container. In addition, the lift truck driver has to be skilled enough to handle difficult loading/unloading operations.

SUMMARY OF THE INVENTION

The present invention has been proposed to solve the above-mentioned problems.

An objection of the present invention is to provide an automated system capable of loading and unloading cargos.

A further object of the present invention is to provide such a system which steers a lift truck to come close to and run parallelly with a guide rail mounted along a side of a traveling path.

It is therefore a primary object of the present invention to provide an automated loading/unloading system which can ease loading and unloading operations in a reliable and safe manner, with more reduced labor.

Another object of the present invention is to provide an automated loaidng/unloading system which requires relatively less floor space than possible with conventional systems.

A still further object of this invention is to provide an automated loading/unloading system which includes external control means to drive its cargo conveyor means so that the conveyor means can be built compact and lightweight.

A further object of this invention is to provide an automated loading/unloading system in which the cargo conveyor means is caused to travel along guide means mounted in a passage board along one side thereof so as to insure safe loading and unloading operations.

To achieve the above and other objects, features and advantages of the present invention, the automated loading/unloading system consists of self-advancing loading/unloading means, a turntable installed between the container (or trailer) and the conveyor of a cargo shipping or receiving center and rotatably disposed to turn, when the loading/unloading means is on it, to change the direction of the loading/unloading means, guide means installed to run along one edge of a passage board that extends between the container and the turntable and adapted to guide the loading/unloading means in movement on the passage board, and external control means to drive the loading/unloading means and turntable according to computer programs.

BRIEF DESCRIPTION OF THE DRAWINGS

FIG. 2(a) is a side view of a lift truck and FIG. 2(b) is a partial view of the lift truck with its forks in raised positions;

FIG. 3 is a flat view of the lift truck of FIG. 2(a);

DETAILED DESCRIPTION OF THE PREFERRED EMBODIMENTS

Figure 1:
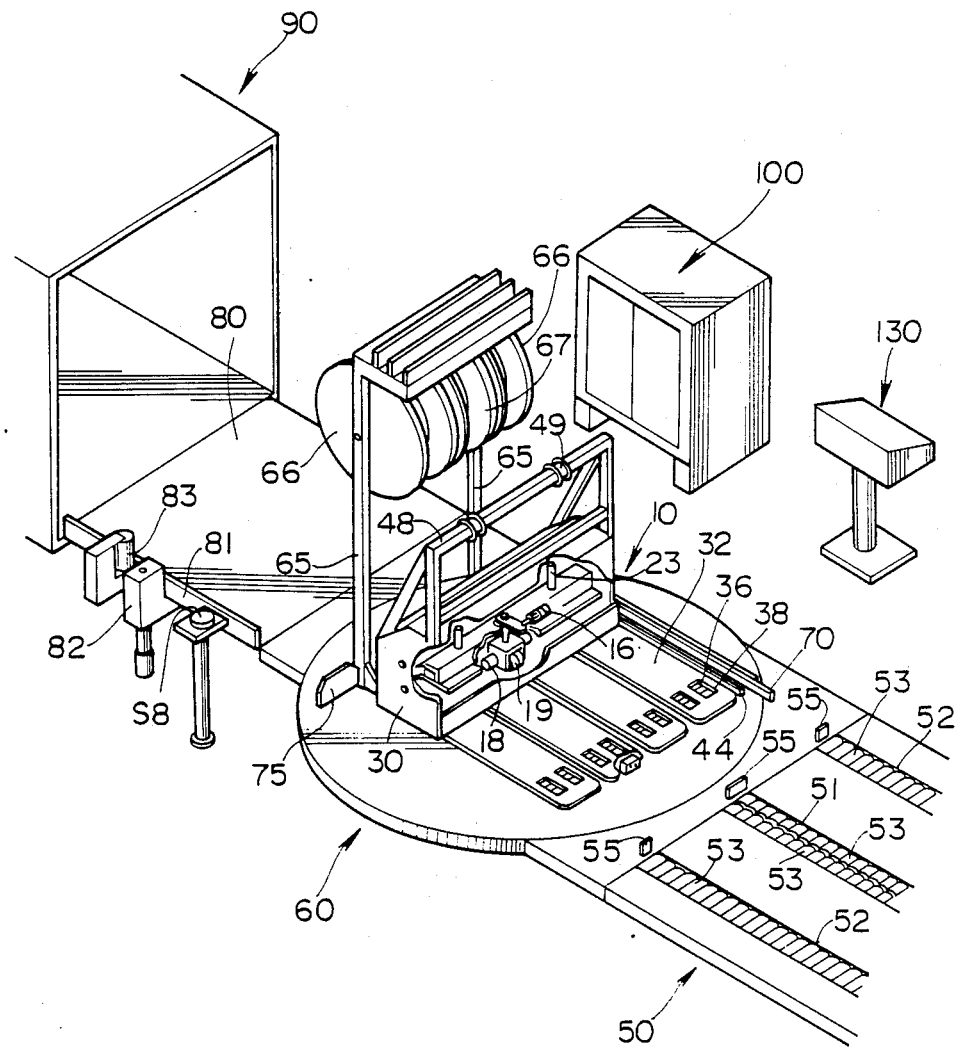
FIG. 1 is a perspective view of the overall structure of a typical automated loading/unloading system constructed in accordance with the present invention.

Referring to FIG. 1, the automated loading/unloading system constructed in accordance with the present invention, devised for installation between the conveyor 50 of a port warehouse or a factory and a container 90 in such a manner that cargo from the conveyor is loaded into the container or vice versa, consists of a lift truck 10 for carrying cases of the cargo between the conveyor 50 and container 90. A turntable 60 is provided mounted adjacent to the conveyor 50, with its top surface held coplanar with the conveyor to ease moving of cases between them, and rotatably disposed to turn, when a lift truck 10 is centered on its top surface, to change the orientation of the truck. Also, a transport passage 80 is mounted extended between the turntable 60 and container 90, provided for a lift truck 10 to reach the container for loading into or unloading the cargo into it. The system also comprises an external power unit 100 to control travel and steering of a lift truck 10 in the system and the turntable 60 and a control unit 120 to control the power unit 100 in response to the signal from sensors mounted at key locations in the system.

The lift truck 10 has a body slightly smaller across than the inside breadth of the container 90. Also, the lift truck 10 comprises a horizontally supported, elongate boxlike frame 12. As can best be shown in FIGS. 2 and 3, a steering column 13 is provided mounted in vertical position in the center of the frame 12 at a point adjacent to the rear side of the frame, and is freely rotatably disposed for rotation about a vertical axis. The steering column 13 is joined at a top end thereof a steering lever 14. Also, the steering lever 14 is connected to a forward end thereof to a hydraulic cylinder 16 through its reciprocating piston rod 16a for the reason as will later be explained. The hydraulic cylinder 16 is provided for steering the lift truck 10 and has its one end pivoted in a bracket 15.

To a lower end of the steering column 13 is drivingly connected a driving wheel 19. A hydraulic motor 18 is provided mounted to drive the driving wheel 19. It is so designed that the hydraulic cylinder 16 swivels the driving wheel 19 through a small angle $\theta$, preferably 1.5° to 2.0° with respect to the centerline of the truck to change direction of the wheel and the truck.

Also, the frame 12 has at a lower front face thereof a horizontal row of four brackets 20 as shown in FIG. 2. A pair of auxiliary road wheels 21 are rotatably pivoted in the outermost two of the brackets 20 to balance the body of the lift truck 10. A pair of lifting hydraulic cylinders 23 are provided mounted in the frame 12 and have their respective reciprocating piston rods connected through metal fittings 25 to a casing 30 in such a manner that actuation of the hydraulic cylinders 23 moves the casing 30 in a vertical direction.

Figure 13:
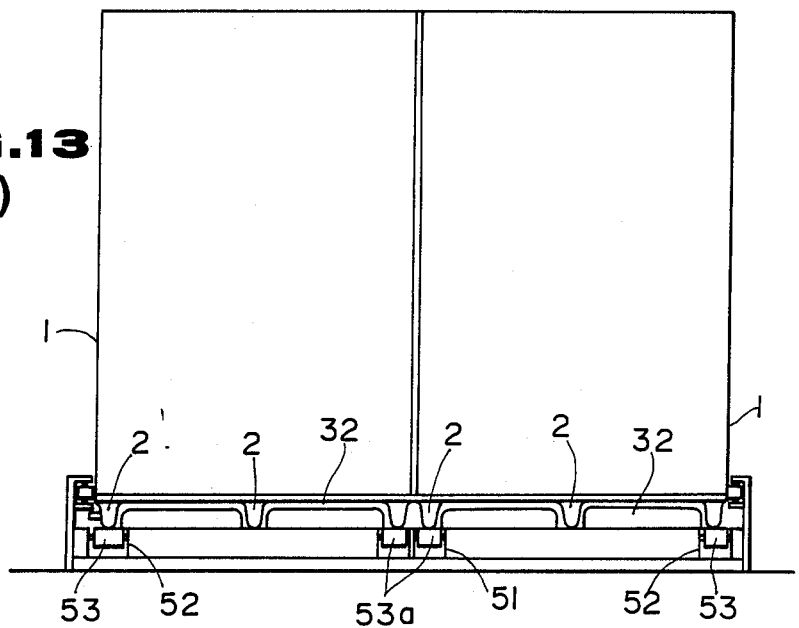
FIGS. 13(a) and 13(b) are views of a cargo case in its different phases of transport along the track.
Figure 13:
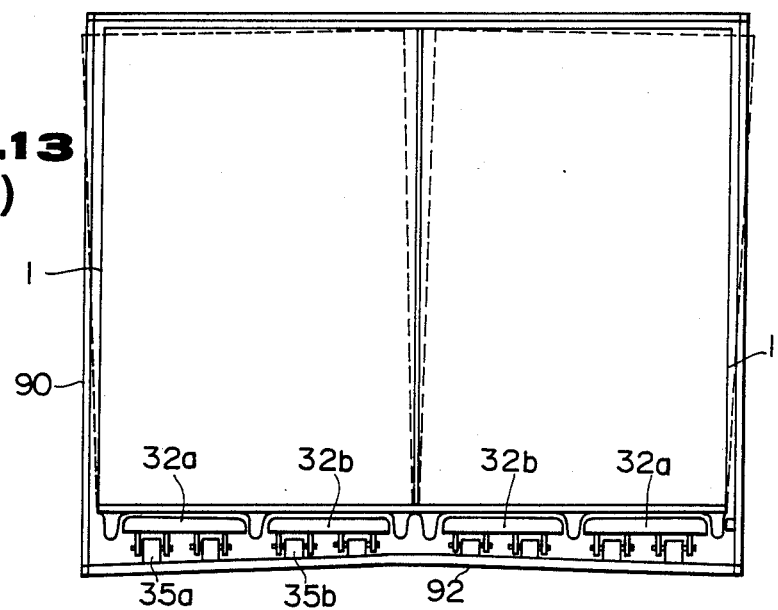

The casing 30 preferably is of rigid construction, largely box-shaped, and large enough to enclose the driving wheel 19 and two auxiliary wheels 21 below, and includes a front plate 31. Fixedly secured to the front plate 31 along its lower edge are four forks 32 for moving cases of cargo, separated by an equal spacing d such as to be inserted into a cargo carrying pallette between its legs 2, as can best be seen in FIG. 3 and FIG. 13. The forks 32 comprises an outer pair 32a and an inner pair 32b of them in FIG. 13a and FIG. 13b.

Each of the forks 32 carries at a forward end thereof a pair of rollers 35 that is encased in a bogie frame 36. The bogie frame 36 is pivotally disposed for bobbing motion about a pivot pin 37 between a retracted position where the rollers 35 are retracted into a pocket formed in the fork 32 and a lowered position where the rollers are lowered to ground. The pin 37 is affixed to lower ends of a pair of hinged levers 34 that are rotatably pivoted on a pin 33. It is so arranged that the rollers 35 swivel through a small angle $\theta$, preferably 1.5° with respect to the longitudinal axis of the fork 32. As can best be shown in FIG. 13(b), the rollers 35a in the outer pair of forks 32a preferably are slightly larger in diameter than the rollers 35b of the inner fork pair 32b. This arrangement of differential roller diameters is provided for the forks as the whole to support the cargo 1 in two breadwise placed cases in a substantially horizontal position when the lift truck 10 is inside the container 90 since the floor 92 of the container is generally slightly swelled out in the center compared with its lateral edges.

Also, the casing 30 is supported on either lateral side by two pairs of crank bars 39 and 40 that are pivotally disposed for pivotal motion about separate pivots 41. Each pair of crank bars 39 and 40 forms a substantially parallelogram with the brackets 20 on the same side, an arrangement to strengthen the posture of the casing 30 in vertical movement. Furthermore, each of the crank bars 40 preferably is a bell crank and is connected at a lower end thereof to a top end of the corresponding lever 34 through a connecting rod 42. As shown in FIG. 2(b), upward movement of the casing 30 causes the levers 34 to rotate anticlockwise in the drawing through the bell cranks 40 and the connecting rods 42, bringing the bogie frames 36 with the rollers 35 to move down away from their forks 32 to ground.

The lift truck 10 carries a guide bar 44 that is secured to one lateral side of the casing 30 (the left side in the embodiment shown in the drawing). The guide bar 44 is supported substantially horizontally, extending forward from the casing 30 almost to the tip of the forks 32, and provided along the side opposite the casing with a plurality of freely rotatable rollers 45 for guiding contact with a guide rail 81 that is horizontally laid on the transport passage 80 along its left edge in the drawing. In operation, the container 90 is situated to bring its left-side wall in alignment with the guide rail 81 so that the lift truck 10 moving on the transport passage 80 is led into the container 90, guided first by the guide rail 81 then the inside leftside wall of the container. Preferably, a rear guide bar 46 is provided also secured to the left-side of the casing 30 and substantially horizontally supported to extend rearward, with a plurality of freely rotatable rollers 47 on the side opposite to the casing for guiding contact with the guide rail 80 when the lift truck 10 moves backward down the transport passage 80 away from the container 90.

As can be shown in FIG. 3, a window cover 38 is provided to close the pocket housing the bogie frame 36 with rollers 35 in each of the forks 32. The lift truck 10 has at its cab's top portion a backrest 48 as shown in FIG. 1 and a hydraulic hose guide 49 attached to the backrest 48.

Upper and lower limit sensors S1 and S2, respectively, are provided which send a signal when the casing 30 in its vertical movement reaches an upper or a lower limit where it comes into an upper or a lower limit tab 27 both installed in fixed positions in the frame 12.

Stop position sensors S3 and S4 are provided installed at the tip of one of the forks 32 and at a rear end of the casing 30, respectively, which sends a signal when the lift truck 10 in its forward or backward travel arrives at a point where it has to stop to prevent colliding contact with any object in the way such as a case of cargo or the front wall of the container 90. The sensors S3 and S4 may be of a type capable of optical or supersonic detection.

Figure 6:
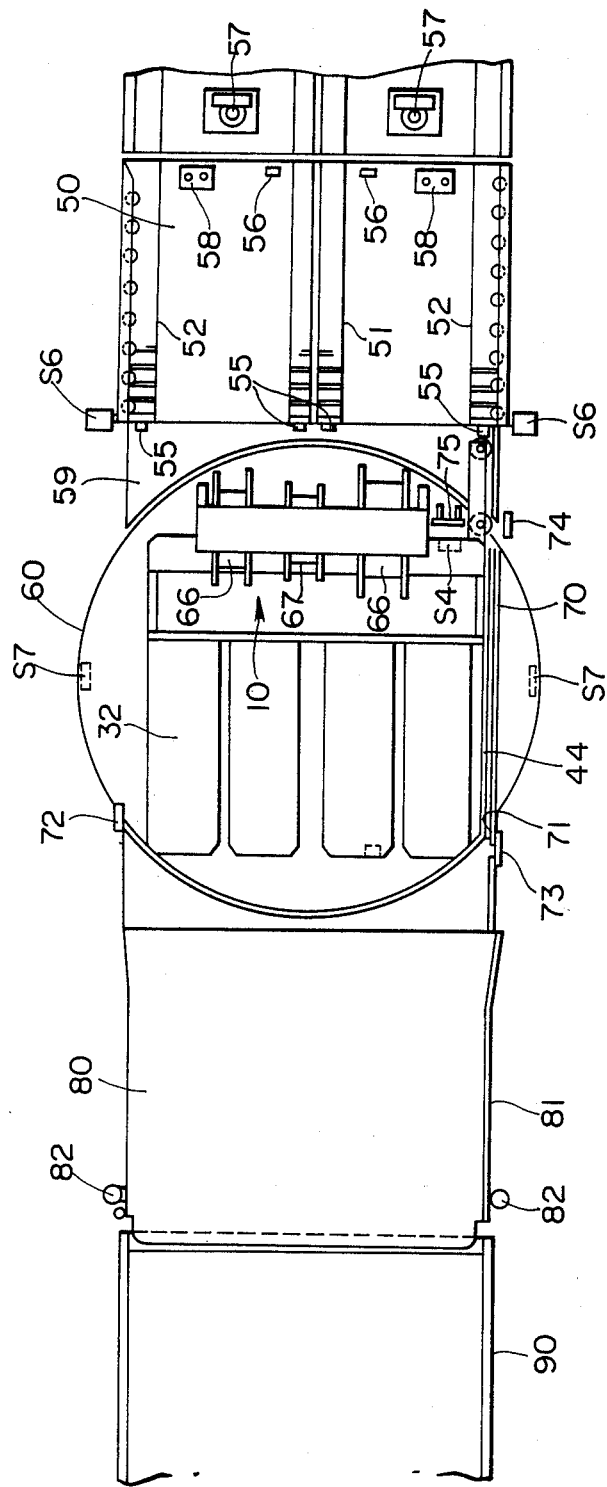
FIG. 6 is a flat view of the transport track of FIG. 5.
Figure 7:
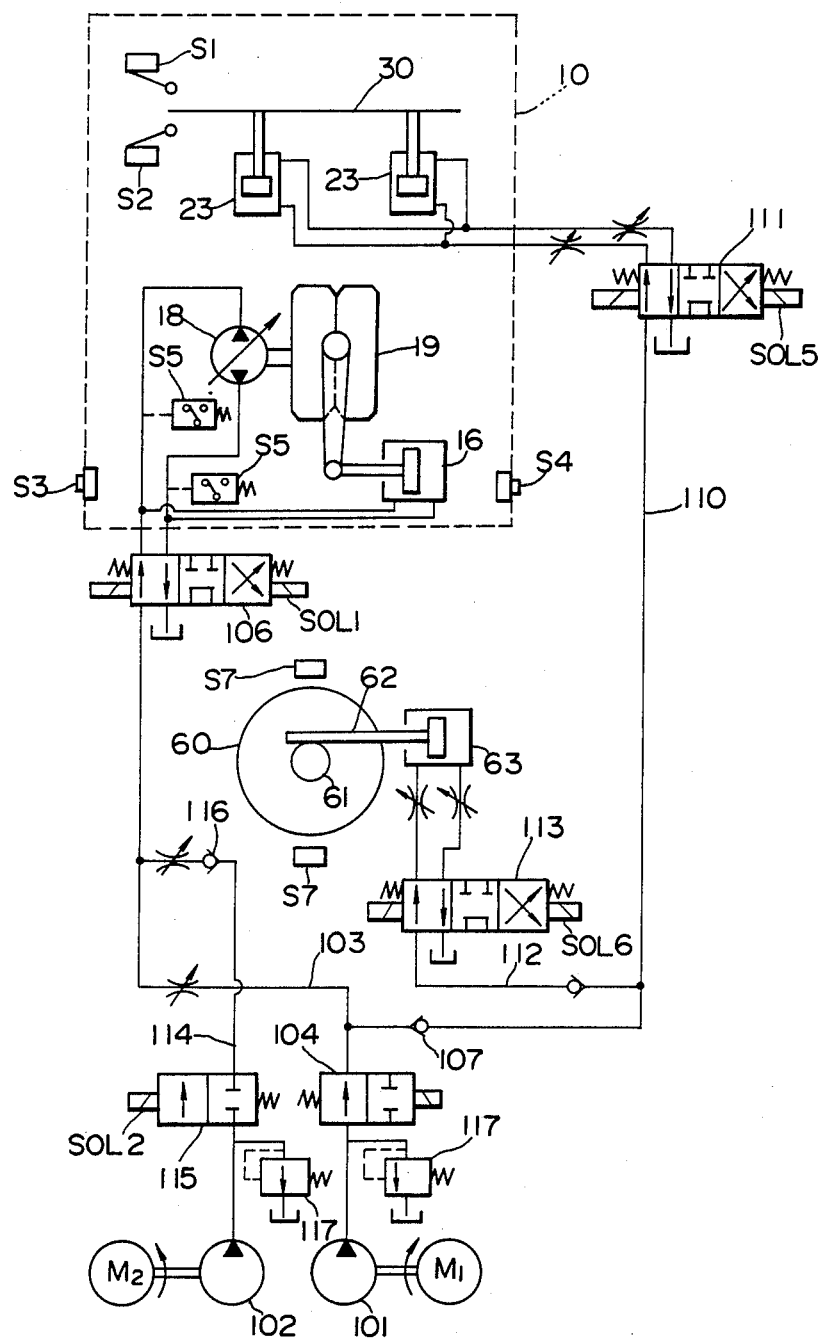
FIG. 7 is a diagram of the power unit hydraulic line of the system of this invention.

Referring to FIG. 7, a pressure sensor S5 is provided mounted in the hydraulic line of the hydraulic motor 18 which monitors hydraulic oil pressure. These sensors S1 through S5 are electrically connected to the control unit 120 which receives signals therefrom for control of the automatic loading/unloading sytsem of this invention when the lift truck 10 is operated in the transport track depicted in FIGS. 5 and 6.

Referring to FIG. 1, the conveyor 50, which may be installed between the delivery station and the packing division of a factory, may preferably be a free flow type and wide enough to carry a single case of width equal to the inside breadth of the container 90 or two cases, at one time, each of equal width equivalent to half the inside container breadth. The conveyor 50 may comprises three channels 51, 52 and spaced apart to accommodate the legs 2 of a pallette on which the cargo is slided along on the conveyor 50 to the turntable 60. Each of the channels 51,52 carries therein a multiple of freely rotatably disposed rollers 53, as can best be shown in FIG. 13(a), to ease the movement of pallettes on the conveyor 50. Preferably, the middle channel 51 may include two longitudinal rows of rollers 53a so that the conveyor can convey two pallettes side by side at one time, each loaded with a case of cargo of width half the breadth of the conveyor 50, with their respective legs 2 being slided along one roller row 53a and the rollers 53 of one outer channel 51. With this arrangement, the conveyor 50 permits the sliding of two pallettes independently of each other.

Figure 5:
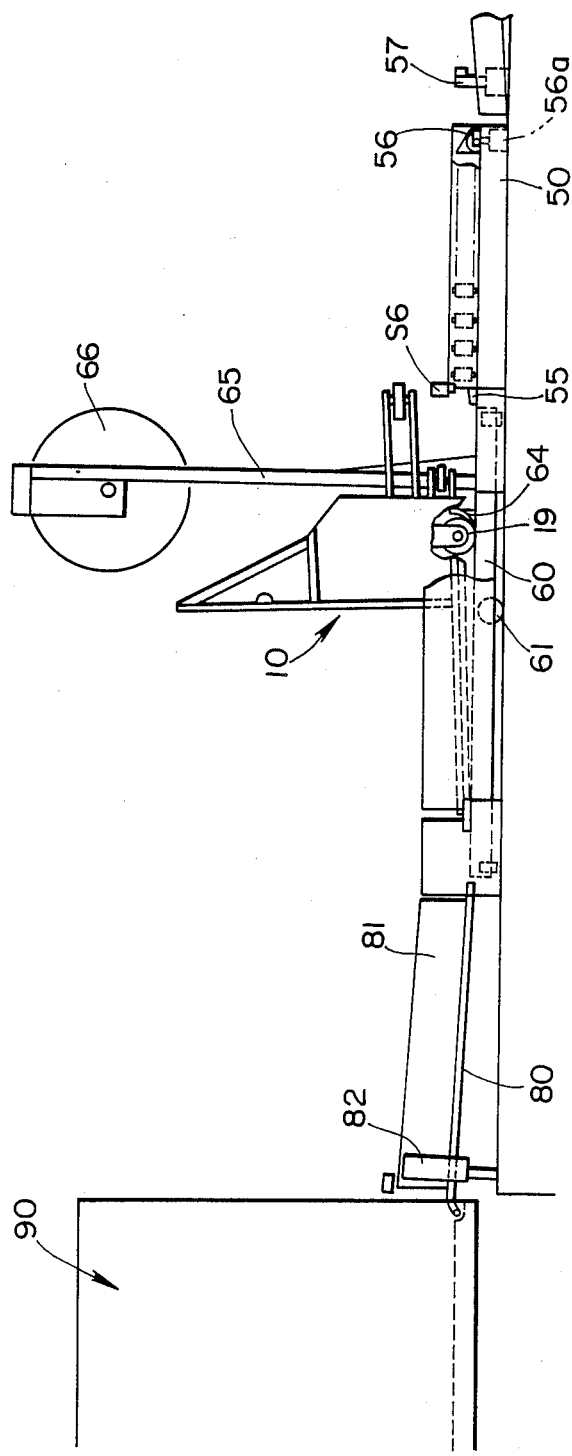
FIG. 5 is a side view of the transport track of the system according to the present invention.

Also, referring to FIGS. 1 and 5, at one end of each of the channels 51, 52 on the side of the turntable 60 are provided stoppers 55 which stop the coming pallettes on the conveyor by abutting against their legs 2 (see FIG. 13a) at a location where the pallettes are to be picked up by the lift truck 10. Catches 56 are provided installed in the channels 51, 52 opposite the stoppers 55 to arrest the pallettes in position by engaging the trailing end of the cases on the pallettes at the moment when their legs 2 come into abutting contact with the stoppers 55 so as to prevent the pallettes from backing off. The catches 56 may be pivotally hinged for oscillatory move between a retracted position where they are retracted into pockets in the conveyor and a raised position where to engage the rear end of the cases. Hydraulic means 56a may be provided which are adapted to control the action of the catches 56 between their two positions.

Referring to FIG. 6, cushion tabs 58 are installed in the conveyor 50 adjacent to the catches 56 and adapted to stop the lift truck 10 when it moves forward to pick up the pallettes from the conveyor 50 by abutting against the tip of the forks 32.

Referring back to FIGS. 1 and FIG. 6, the turntable 60 is installed adjacent to the conveyor 50 and includes a bridge board 59 mounted to interconnect opposite ends of the turntable 60 and the conveyor 50, adapted to enable the passage of pallettes across them. As shown in FIG. 7, the turntable is drivingly connected to an arrangement of a pinion 61 and a rack 62 which in turn is driven by any suitable drive means such as a hydraulic cylinder 63 to rotate the turntable 60 in either way through an angle of approximately 180°. When the lift truck 10 is backed down the passage 80 from the container 60 onto the turntable 60, the hydraulic cylinder 63 is actuated to turn the lift truck in one direction through 180° so that the truck is oriented right for picking up the pallettes at the end of the conveyor 50. When the lift truck 10 is loaded with the pallettes with the cases of cargo, the turntable 60 is then rotated in the opposite direction through 180° to align the truck with the passage 80.

With respect to FIG. 5, stoppers 64 are provided mounted in the turntable 60 to stop the lift truck 10 in fixed position by engaging the driving wheel 19. As shown in FIGS. 1 and 5, the turntable 60 includes a hanger consisting of sturdy vertical posts 65 at one end thereof. Between the posts 65 are supported two drums 66 around which hydraulic lines for lift truck drive and fork lifting are wound and a third drum 67 around which signal cables.

The hydraulic lines are interconnected between two hydraulic pumps 101 and 102 in the power unit 100, shown in FIG. 1, and the hydraulic cylinders 16 and 23 for steering the lift truck 10 and moving the casing 30, respectively. Also, the signal cables connect the sensors S1 through S5 to the control unit 120 for purposes of controlling the system as will later be described in detail. Preferably, the drums 66 and 67 are freely rotatably disposed to turn about their own axis to unwind or rewind the cable and hydraulic lines according to the position of the lift truck 10 in the transport track.

A guide rail 70 is provided extending through one end of the turntable 60, as shown in FIGS. 1 and 6, and is adapted to guide the movement of the lift truck 10 in the turntable 60. A projecting plate 71 is secured to one end of the turntable adjacent to the guide rail 70 and a similar projecting plate 72 is provided mounted also in the turntable 60 at a location opposite the plate 71 across its top surface. A pair of similar stoppers 73 and 74 are provided mounted at opposite locations adjacent to the transport passage 80 and the conveyor 50, respectively, for abutting engagement with one of the projecting plates 71 and 72 to stop the turntable 60 in correct position when it is rotated in either direction to orient the lift truck to the container or the conveyor.

In FIG. 6, the sensor S4 includes a reflector 75 which reflects the light beam or supersonic wave from the sensor S4 to cause the lift truck 10 to determine where to stop in its backward movement in the track. The turntable 60 includes a pair of limit switches S7 adapted to detect where to stop the turntable 60 in rotation.

The transport passage 80 interconnected between the turntable 60 and the container 90 are provided to permit the lift truck 10 to carry its cases of cargo over to the container 90 from the turntable. The transport passage 80 may preferably includes a pair of hydraulic lifters 82 at one end thereof on both sides which moves the passage 80 to level flush with the floor of the container 90 to ease the entrance of the lift truck 10 into the container. Also, the guide rail 81 extending along one edge of the transport passage 80 includes at least an auxiliary roller 83, as shown in FIG. 1, to facilitate the movement of the lift truck 10 guided by the guide rail 81 and an emergency stop switch for use in emergency as when the lift truck 10 causes serious trouble.

Referring to FIG. 7 showing the hydraulic system of the invention in diagrammatic form for controlling the lift truck 10 and the turntable 60, hydraulic pumps 101 and 102 are operatively connected to motors M1 and M2, respectively. The pump 101 is a high-pressure, low-delivery type while the pump 102 is a low pressure, high-delivery type. The high-pressure, low delivery pump 101 is connected to a hydraulic line 103 that extends via a normally-open valve 104 to a four-port, three-position control valve 106 provided for controlling lift truck directional change. A branch line from the three-position valve 106 goes to the hydraulic motor 18 for controlling the driving wheel 19. The motor 18 may be a vane-type, variable delivery, reversible type which turns in one direction or other depending on the direction of high-pressure oil flow from the valve 106 so as to move the lift truck 10 forward or backward through the driving wheel 19. A second branch from the three-position control valve 106 is connected to the hydraulic cylinder 16 for steering the driving wheel 19 which swivels the driving wheel in one way or other with respect to the truck's center line depending on the direction of rotation of the hydraulic motor 18.

Also, a first branch 110 from the high-pressure line 103 goes via a check valve 107 to a four-port, threeposition control valve 111 which controls the hydraulic lift cylinders 23 for moving the casing 30 and forks 32.

Additionally, a second branch 112 from the highpressure line 103 is connected through a four-port, threeposition control valve 113 that is hydraulically connected to the hydraulic cylinder 63 to control the rotation of the turntable 60.

The low-pressure, high-delivery pump 102 connects to a low-pressure line 114 comprising a normally-closed valve 115. The low-pressure line 114 joins the high-pressure line 103 at a point upstream of the three-port control valve 106 to supply the low-pressure oil from the pump 102 to the hydraulic motor 18 so as to run the driving wheel 19 at a high speed. Both high-pressure and low-pressure lines 103 and 114 are each provided with a relief valve 117 at a point downstream of their respective pump.

Figure 8:
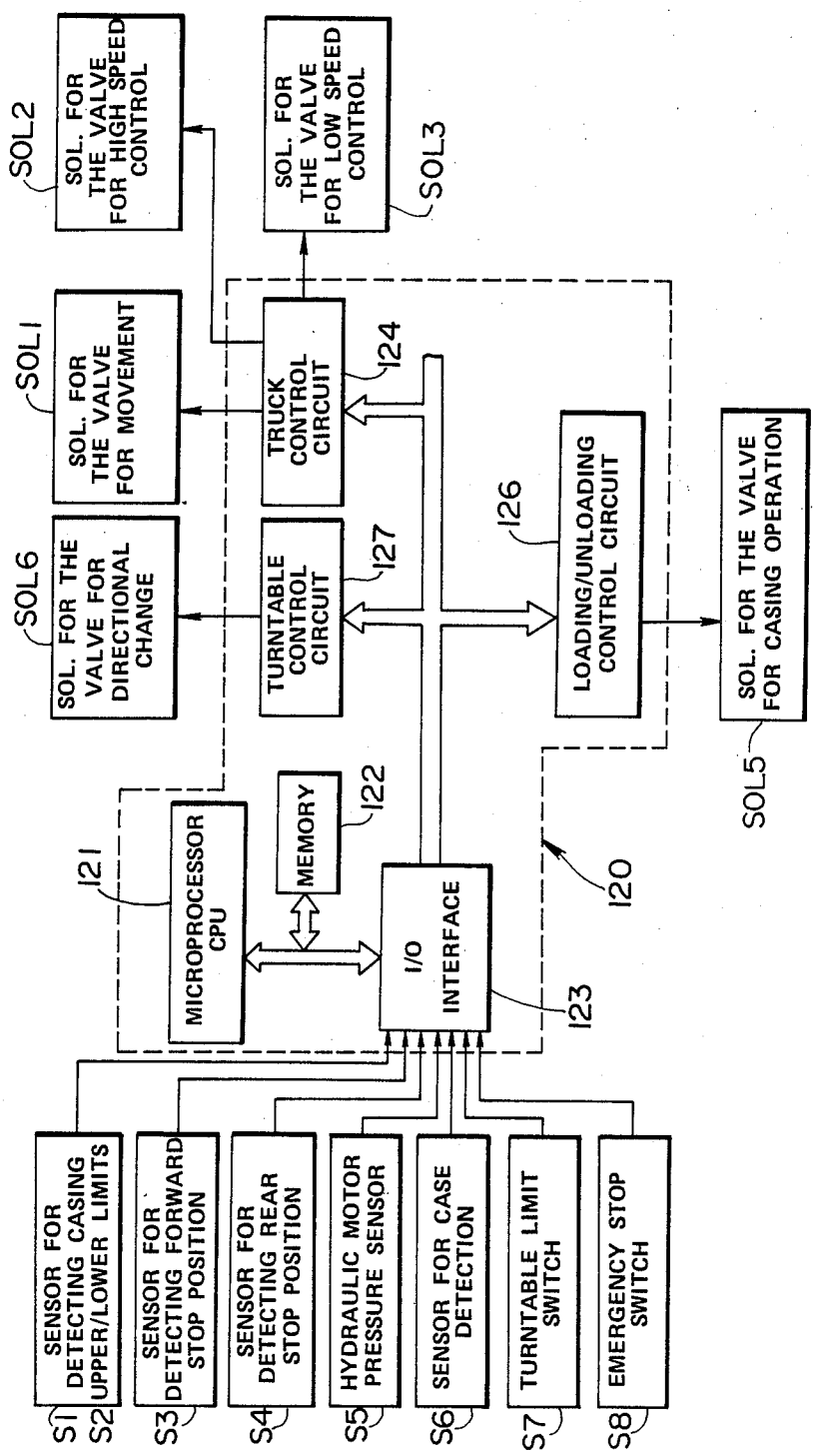
FIG. 8 is a diagram of the control circuits for controlling the turntable and lift trucks in the transport track.

Referring to FIG. 8 showing the control circuit in diagrammatic form for controlling the lift truck 10 and the turntable 60, the control unit 120 comprises a microprocessor (CPU) 121 with a memory 122 and an I/O interface 123. Connected to the I/O interface 123 are the following: The limit sensors S1 and S2 for detecting the upper and lower stop positions of the casing 30 in the lift truck 10; the stop position sensors S3 and S4 for detecting the safe point of loading or unloading at the conveyor 50 or the container 90; the pressure sensor S5 for hydraulic motor pressure level monitoring; the case sensor S6 for detecting the cases to be handled presently at the conveyor 50; the limit switches S7 for controlling the rotation of the turntable 60; and the emergency stop switch S8 for emergency stop at the transport passage 80.

Also, the I/0 interface 123 is connected to a circuit 124 for controlling the movement of the lift truck 10, a second circuit 126 for controlling the loading and unloading operations of the forks, and a third circuit 127 for controlling the turntable 60. A first solenoid SOL1 for controlling the valve 104 and a second solenoid SOL2 for the valve 106 are respectively operatively connected to the control circuit 124. Also, a third solenoid SOL5 for controlling the valve 111 is operatively connected to the control circuit 126 while a fourth solenoid SOL6 for controlling the valve 113 is connected to the control circuit 127.

Figure 9A:
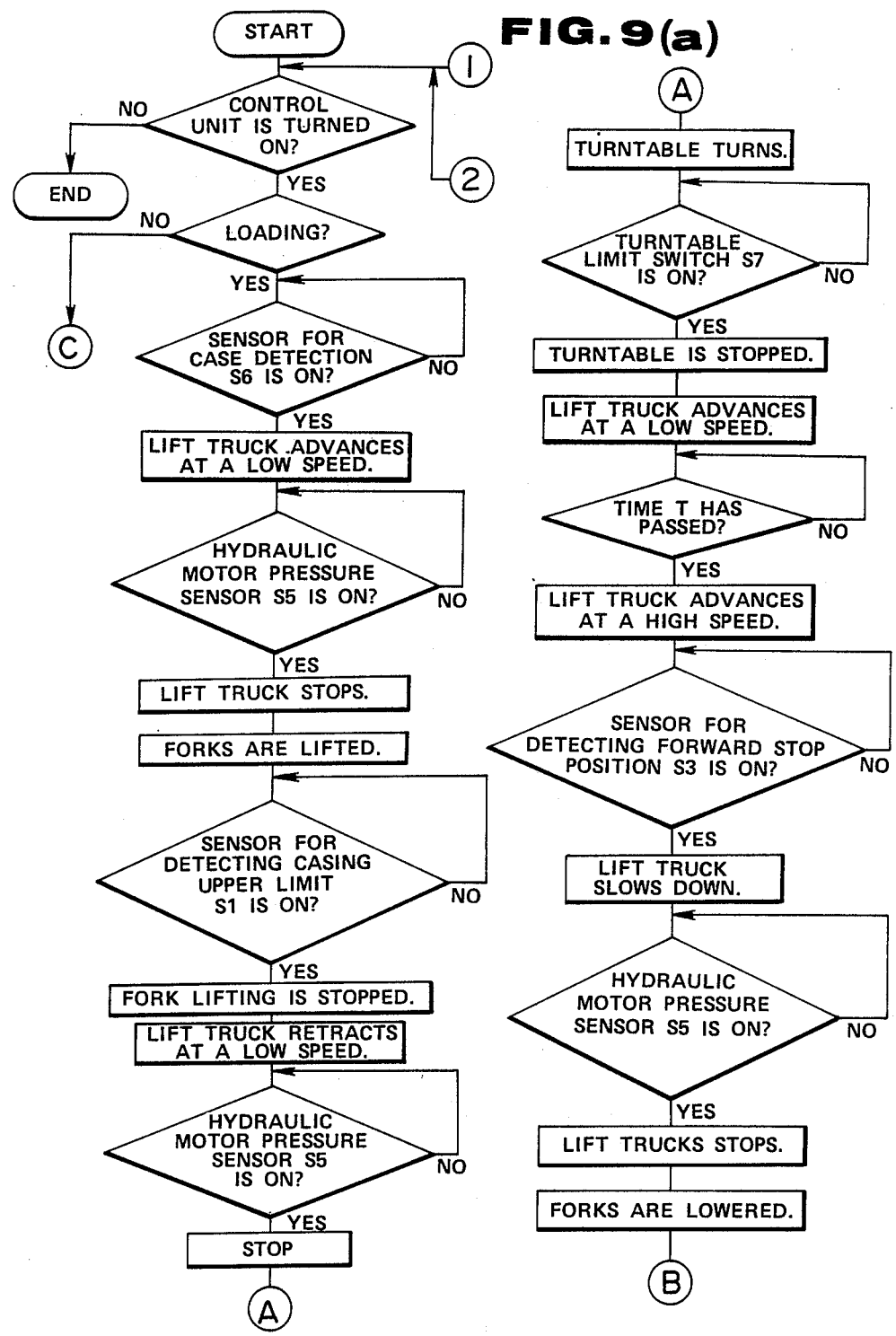
Figs. 9(a), (b) and (c) are respectively flowcharts of programs for loading and unloading operations.
Figure 9B:
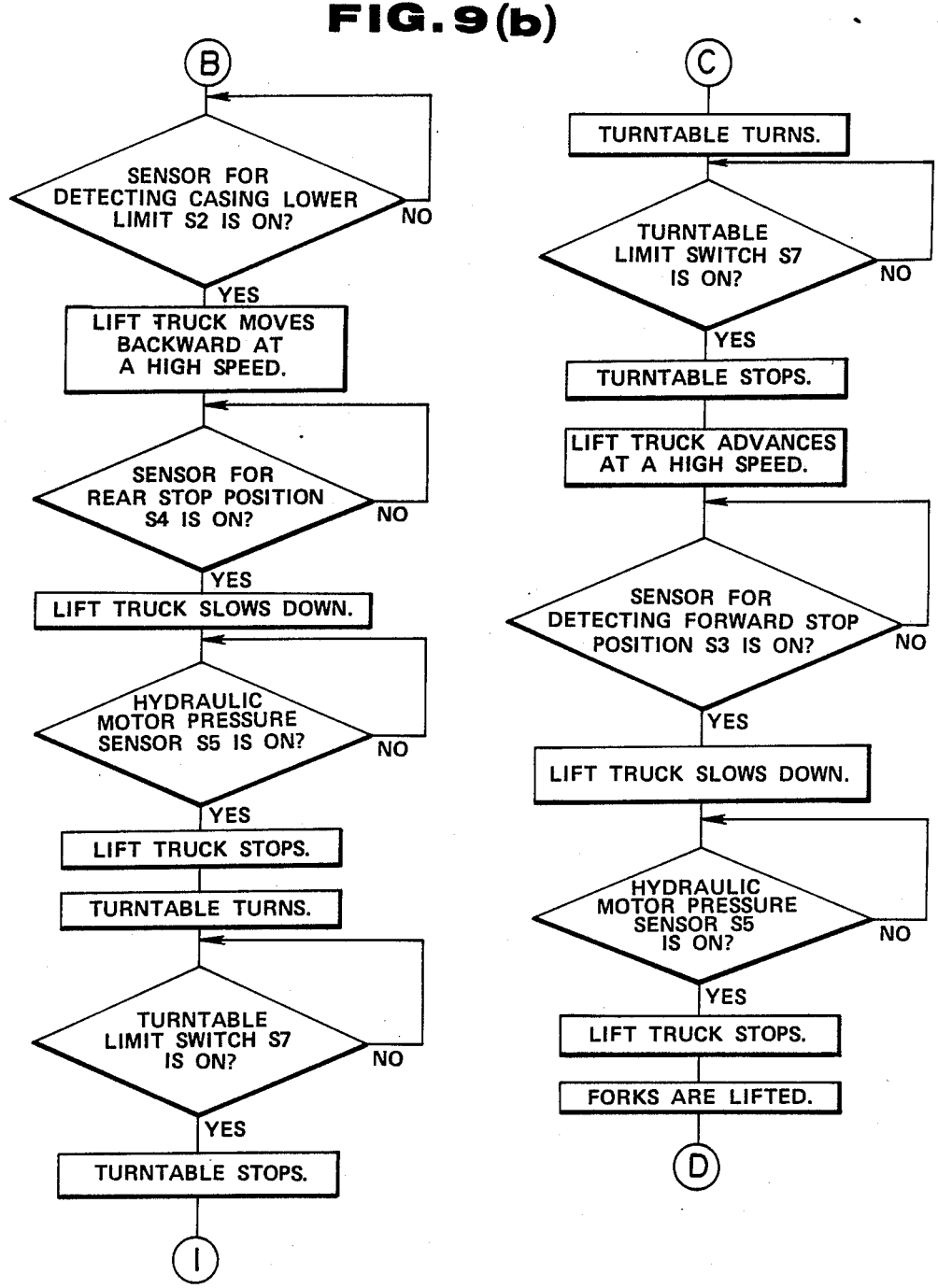
Figure 9C:
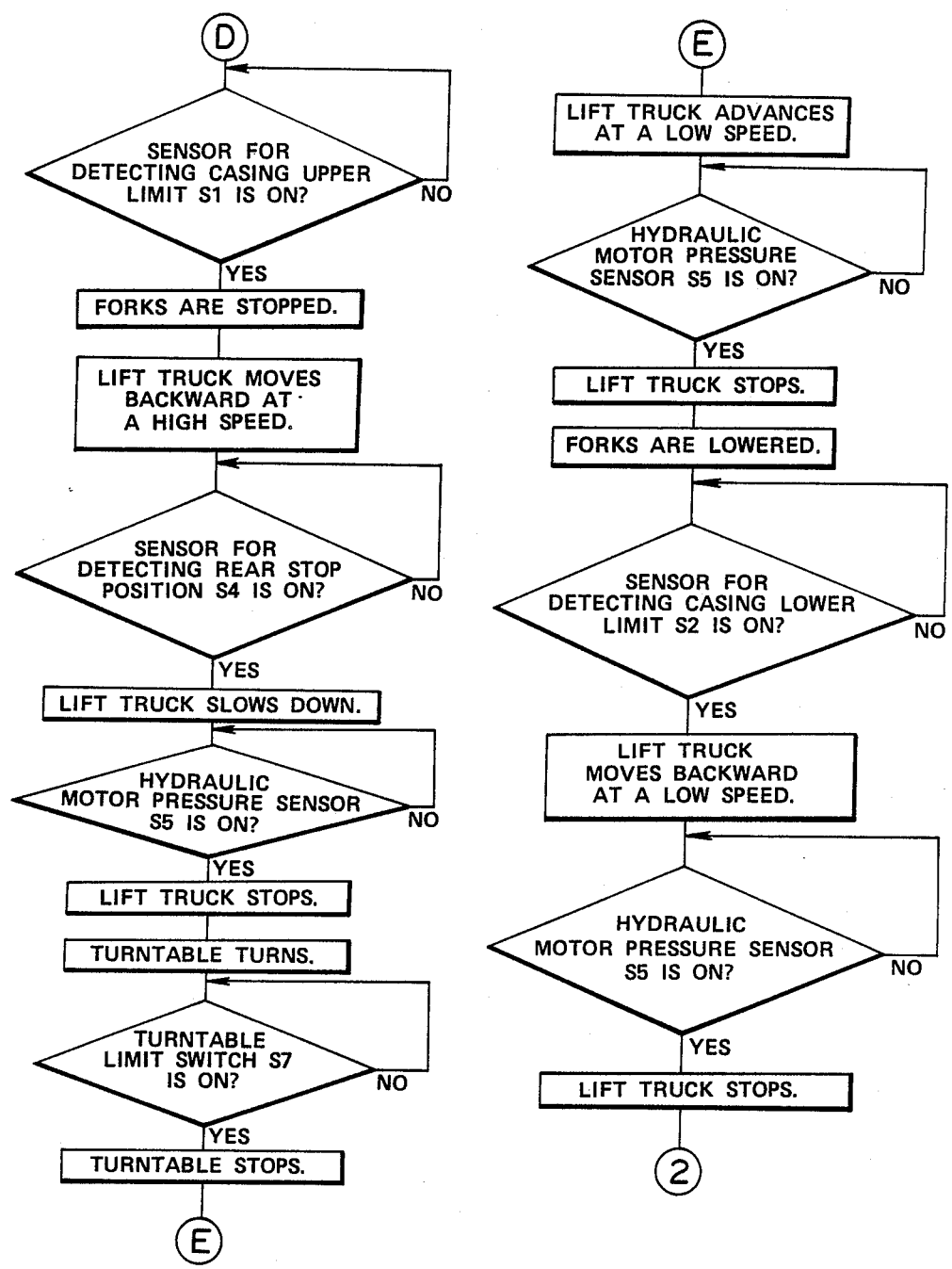
Figure 10:
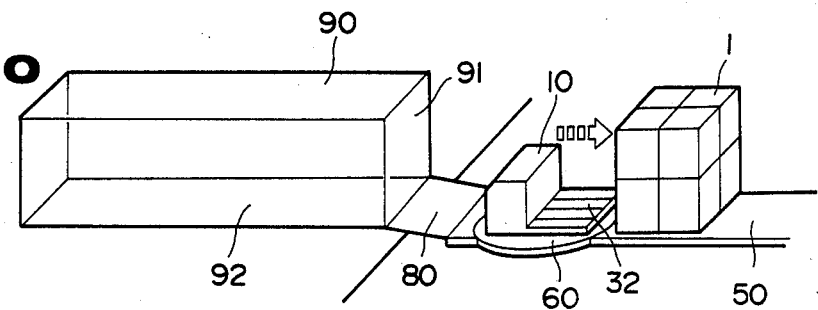
FIGS. 10(a) through 10(h) are explanatory views of a round of loading actions.
Figure 10:
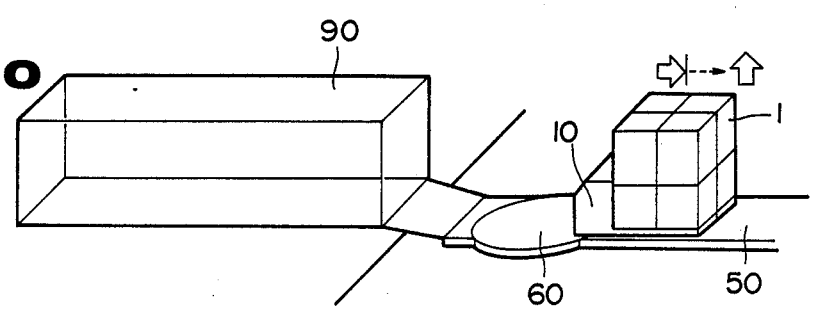
Figure 10:
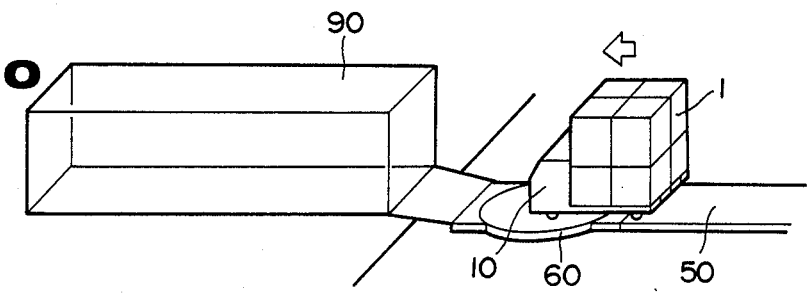
Figure 10:
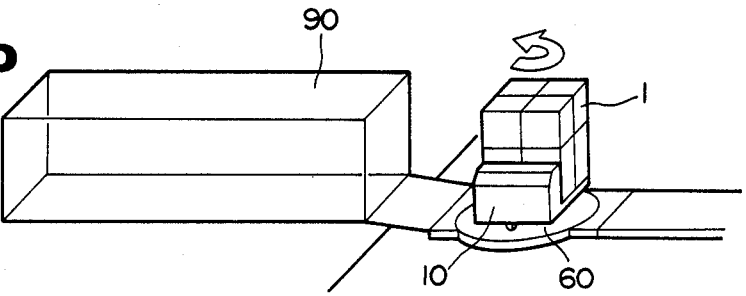
Figure 10:
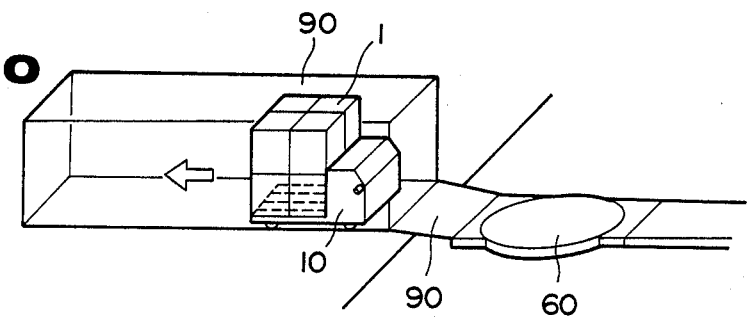
Figure 10:
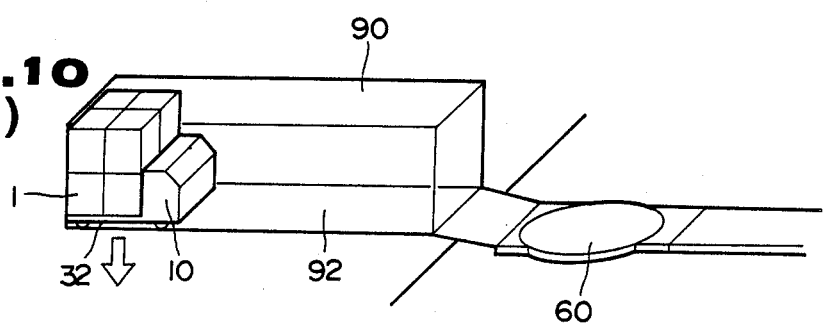
Figure 10:
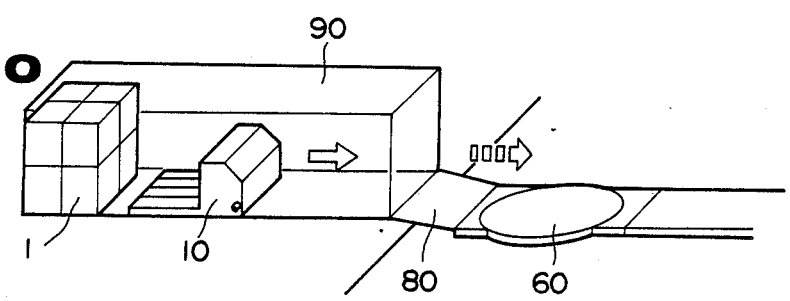
Figure 10:
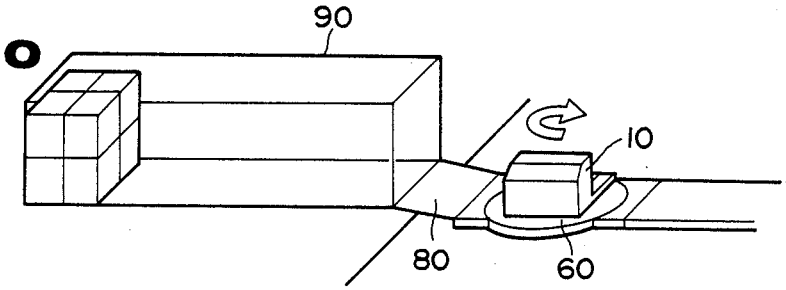

With the above arrangement, the CPU 121 processes the signal from the sensors S1 through S8 to operate the lift truck 10, its forks 32, and the turntable 60 through the control circuits 124, 126 and 127 in accordance with programs, as shown in flowchart form in FIG. 9, stored in the memory 122.

The operation of the automated loading/unloading system of the present invention will be described in detail in conjuction with FIGS. 9 through 13.

LOADING OPERATION

When an empty container 90 to be loaded is pulled up to the loading position, with its loading mouth 91 in front of the rear end of the transport passage boad 80, the passage 80 is lowered to level flush with the floor 92 of the container 90 by actuation of the hydraulic cylinder 82.

The lift truck 10, which may then stay standstill on the turntable 60 facing the conveyor 50, with the forks 32 lowered, is set ready for operation. Cases 1 of cargo to be shipped, are placed in order on the conveyor 50, passed over from a packing station, not shown. The two cases 1 at front to be handled first by the lift truck are locked in predetermined pick-up position, with their forward end being abutted against the stoppers 55, by the catches 56 engaging with the rear end of the cases.

With the lift truck 10 in this position, when a start button, not shown, is pressed on a control panel 130, the both motors M1 and M2 in the power unit 100 are energized to start the high-pressure, low-delivery pump 101 and the low-pressure, high-delivery pump 102, respectively. When the sensor S6 at the end of the conveyor 50 detects the cases 1 present at the correct pick-up position, it sends a signal to the CPU 121 through the I/0 interface 123 in the control unit 120.

As a result, the CPU 121 energizes the solenoid SOL1 in the power unit 100 thorugh the control circuit 124 to shift the control valve 106 to a position that sets the lift truck for forward movement, bridging the high-pressure, low-delivery pump 101 into fluid-flow relation with the hydraulic motor 18 which in turn rotates the driving wheel 19 causing the lift truck 10 to move forward slowly toward the conveyor 50, holding out its forks 32 at front, the first step of loading operation depicted in FIG. 10(a).

The lift truck 10 is moved forward to insert its forks 32 thorugh the legs 2 of the pallette loaded with the case 1 until the forks bring their tips into abutting contact with the cushion tabs 58. Whereupon the oil pressure sensor S5, detecting the resultant rise in oil pressure of the hydraulic motor 18, sends a signal to the CPU 121 which in turn deenergizes the solenoid SOL1 causing the control circuit 124 to disconnect the hydraulic motor 18 from fluid-flow communication with the high-pressure, low-delivery pump 101. As a result, the lift truck 10 comes to a halt. Simultaneously, the control circuit 126 energizes the solenoid SOL5 to shift the control valve 111 to a position that brings the pump 101 into fluid-flow relation with the cylinders 23 to raise the casing 30.

The casing 30, while being horizontally balanced by the brackets 20 in conjunction with the paired cranks 39, 40, is moved upward to raise the forks 32 with the pallette and the case 1 on. This movement of the bell cranks 40 also causes the levers 34 anticlockwise in FIGS. 2(b) through the connecting rods 42, bringing down the bogie frames 36 with the rollers 35 to ground to thereby support the case 1 at the forks' forward ends, the second step shown in FIG. 10(b).

When the sensor S1 detects the rise of the casing 30 to a predetermined upper stop position, it sends a signal to the control unit which in turn deenergizes the solenoid SOL5 to set through the control circuit 126 the control valve 111 to a position that disconnects the hydraulic cylinders 23 from the pump 101. As a result, the forks are stopped.

Simultaneously, the solenoid SOL1 is actuated through the control circuit 124 to switch the control valve 106 to a position that causes the hydraulic motor 18 to turn in reverse, driving the lift truck 10 to back out slowly toward the turntable 60, the step of loading operation illustrated in FIG. 10(c).

When the lift truck moves back on the turntable 60 and is stopped by the stopper 64 abutting against the driving wheel 19, the hydraulic motor 18 begins to rise in pressure. When the sensor S5 detects the rise of hydraulic motor pressure to a predetermined level, it sends a signal to the CPU 121 which in turn actuates the solenoid SOL6 through the control circuit 127 to switch the control valve 113 to a position that causes the hydraulic cylinder 63 to rotate the turntable 60 through an angle of 180°, turning the lift truck 10 thereon until it comes to face the container 90, the step shown in FIG. 10(d).

When the turntable 60 completes its half circle where it is stopped by the projecting plate 70 coming into abutting contact with the stopper 73, the limit switch S7 in the back of the stopper 73 is turned on. In response to this turning on of the limit switch S7, the CPU 121 energizes the solenoid SOL1 through the control circuit 124 to switch the control valve 106 to the position that causes the hydraulic motor 18 to rotate in such a direction that drives the lift truck 10 to move forward through the driving wheel 19 toward the container 90. This also has the hydraulic cylinder 16 to connect through its other port to the control valve 106 via the branch line connected thereto downstream thereof, thereby causing the driving wheel 19 to swivel in the same way as the rollers 35 in the forks 32, or to the left in FIG. 6, through an angle $\theta$, preferably 1.5°.

With the rollers 35 and the driving wheel 19 thus tilted to the left through angle 0 relative to the center line of the lift truck 10, forward movement across the turntable 60 and up the transport passage 80 urges the lift truck to the left, with its guide bar 44 pressed against the guide rail 70, so that the lift truck is led into the container 90 safely along a substantially straight path without deviation as shown in FIG. 12(a).

When the lift truck 10 passes the joint between the transport passage 80 and container 90 within time period T of its start at the turntable 60, the solenoid SOL2 is energized to open the normally-closed valve 115 to bring the low pressure, high-delivery hydraulic pump 102 into fluid-flow communication with the hydraulic motor 18 to thereby cause the lift truck 10 to run at a high speed further into the container 90, the step shown in FIG. 10(e).

Containers 90 in general have their floor 92 swelled out in the middle as shown in FIG. 13(b). Because of this, the forks of a conventional lift truck on the floor of a container are caused to sag down along their lateral sides. Since the lift truck 10 of the present invention has its rollers 35a made larger in diameter in the outer forks 32a than the rollers 35b in the inner forks 32b, the cargo even in two cases 1 laid side by side can be supported on a substantially horizontal level on the forks 32.

In this particular embodiment, the lift truck 10 is programmed to run first at a low speed and then at a faster speed as it advances from the turntable 60 into the container 90. However, this is only a matter of choice, and the program may be to drive the lift truck 10 at a unitary fast rate of speed all the way through connection of the hydraulic motor 18 to a low-pressure, high-delivery pump.

When the lift truck 10 in its high-speed forward movement in the container 90 reaches a point where the sensor S3 at the tip of the fork 32 detects the end wall of the container 90 or the front face of the cases 1 already loaded, a signal is sent to the CPU 121 which in turn deenergizes the solenoid SOL2 through the control circuit 124 to close the normally-closed valve 115 in the low pressure line 114 thereby reducing oil flow to the hydraulic motor 18. As a result, the lift truck 10 slows down until it stops in front of the container end wall or the front face of the loaded cases 1, so that the hydraulic motor 18 begins to rise in pressure. When the sensor S5 detects the rise in pressure of the hydraulic motor 18 to a predetermined level, a signal is sent to the CPU 121 which in turn deenergizes the solenoid SOL1 disconnecting the hydraulic motor form fluid-flow relation with the low-pressure, high-delivery pump 102.

Then, the control circuit 126 energizes the solenoid SOL5 to switch the control valve 111 to a position that causes the hydraulic cylinders 23 to lower the casing 30 with the forks 32. This movement of the casing 30 also causes the bogie frame 36 with the rollers 35 to lower onto ground through the cranks 40 and the connecting rods 42. As a result, the case 1 are put onto the floor 92 of the container, the step shown in FIG. 10(f).

When the sensor S2 detects the descent of the casing 30 to a predetermined lower limit, a signal is sent to the CPU 121 which in turn energizes the solenoid SOL1 through the control circuit 124 to switch the control valve 106 to a position that causes the driving wheel 19 to run in reverse to thereby driving the lift truck 10 backward. Simultaneously, the solenoid SOL2 is activated to open the normally-closed valve 115 in the low pressure line 114 to bring the hydraulic motor 18 into communication with the low-pressure, high-delivery pump 101. Also, the resultant supply of pressurized oil to the hydraulic cylinder 16 through its other port causes the driving wheel 19 to swivel to the right in FIG. 6 through an angle of approximately 1.5°.

As a result, the lift truck 10 moves backward, with forks 32 drawn and the guide bar 46 pressed against the leftside wall of the container 90 and the guide rail 70, down the transport passage 80 toward the turntable 60, the step of FIG. 10(g).

When the lift truck 10 in its backward movement toward the turntable 60 reaches a point where the sensor S4 catches the light beam or supersonic wave from the reflector 75 at the rear end of the turntable 60, a signal is sent to the CPU 121 which in turn energizes the solenoid SOL2 through the control circuit 124 to close the normallyclosed valve 115 in the low pressure line 114 thereby reducing the flow of pressurized oil from the pump 102 to the hydraulic motor 18. As a result, the lift truck 10 slows down. When the lift truck 10 moving at a low speed on the turntable 60 is stopped by the stoppers 19 abutting against the driving wheel 19, the hydraulic motor 18 begins to rise in pressure. When the sensor S5 detects the rise in pressure of the hydraulic motor 18 to a predetermined level, a signal is sent to the control unit 120 to switch the control valve 106 to the position that stops the hydraulic motor 18. With this step, loading operation completes its whole cycle. The solenoid SOL6 is activated to switch the control valve 113 to the position that brings the hydraulic cylinder 63 into fluid-flow communication with the high-pressure, low-delivery pump 102 causing the turntable 60 to rotate through 180° to thereby turn the lift truck 10 until it faces the conveyor 50 where the turntable 60 is stopped by the signal from the limit switch S7, the step shown in FIG. 10(b).

UNLOADING OPERATION

Figure 11:
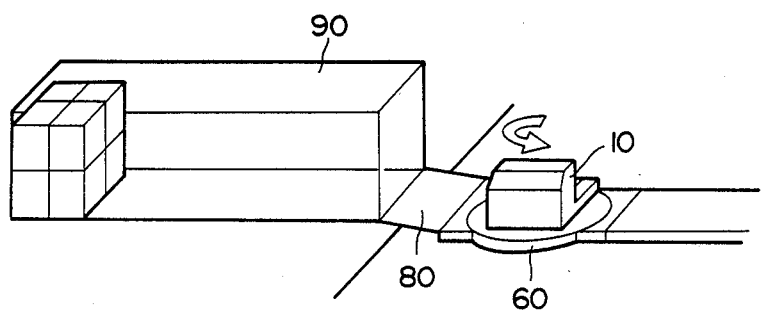
FIGS. 11(a) through 11(h) are explanatory views of a round of unloading actions.
Figure 11:
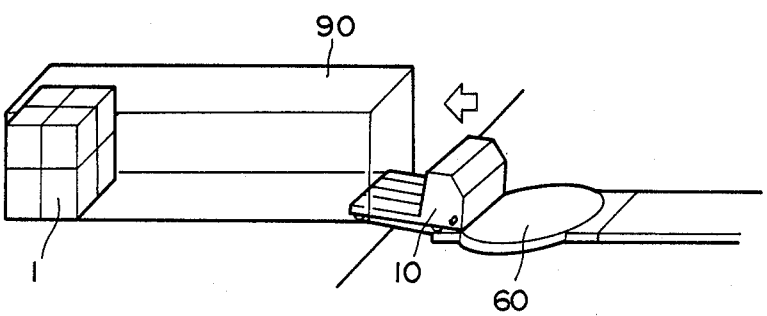
Figure 11:
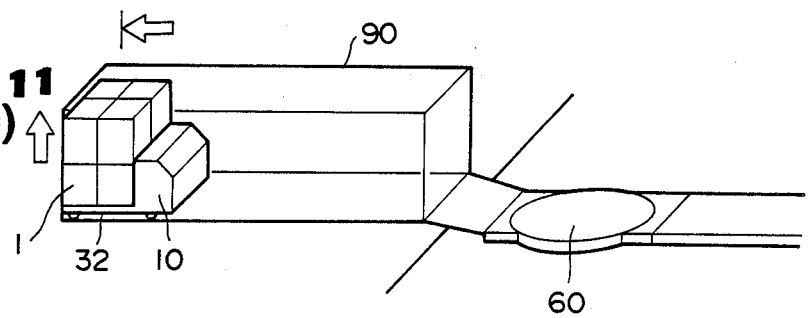
Figure 11:
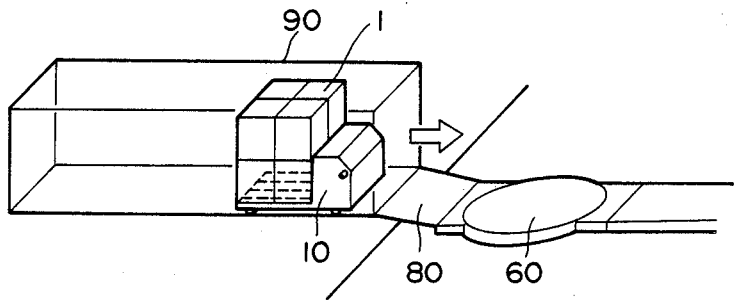
Figure 11:
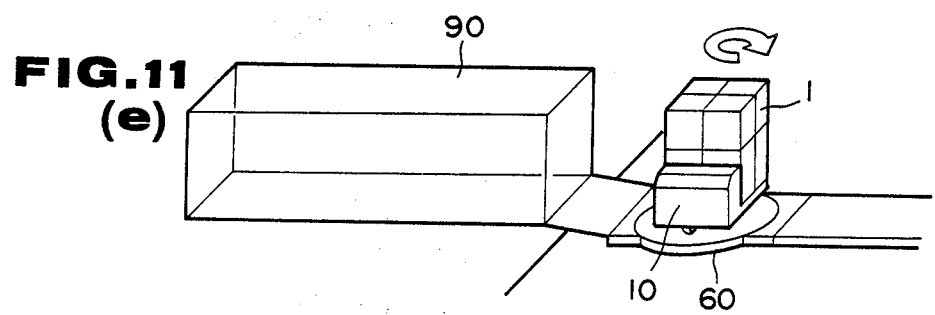
Figure 11:
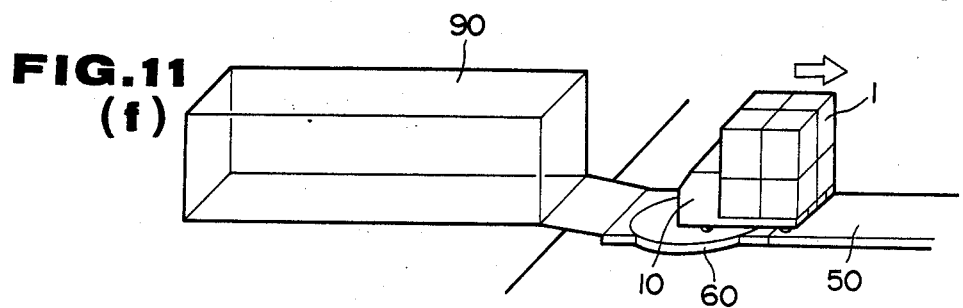
Figure 11:
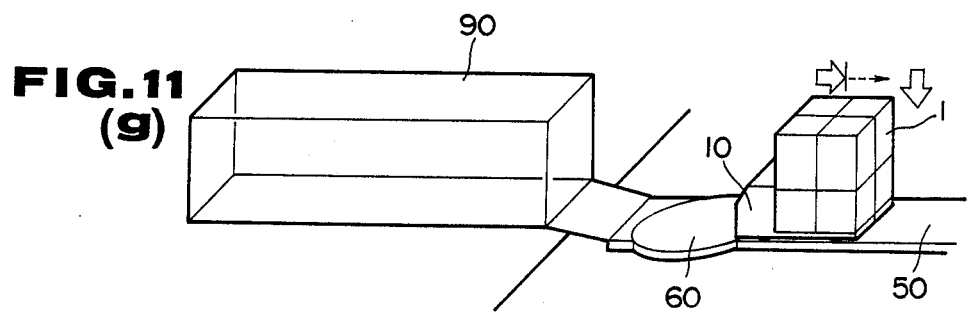
Figure 11:
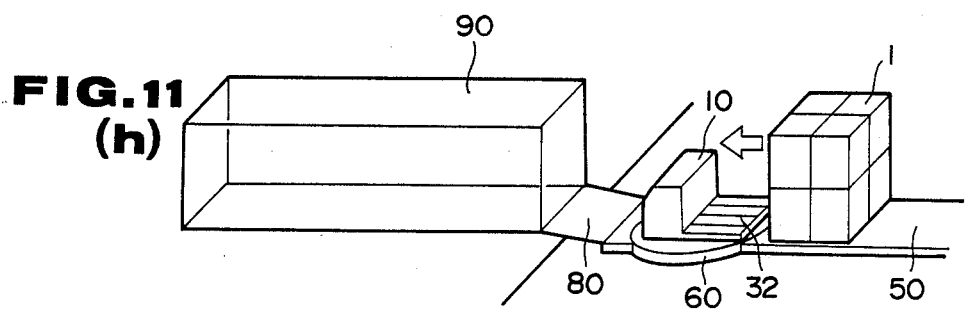
Figure 12:
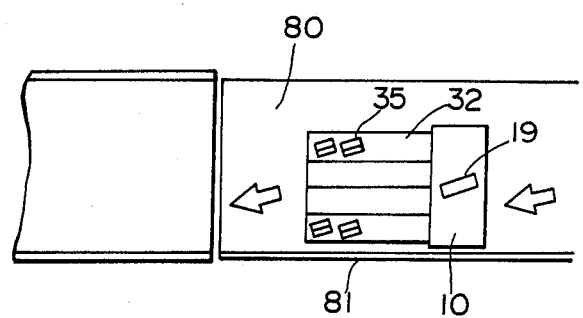
FIGS. 12(a) through 12(d) are views of a lift truck in its different points of travel along the transport track.
Figure 12:
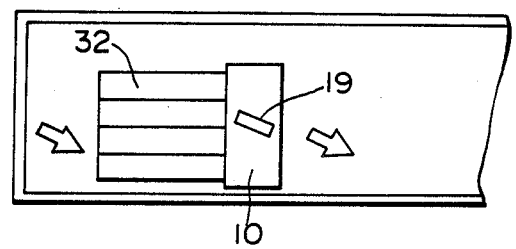
Figure 12:
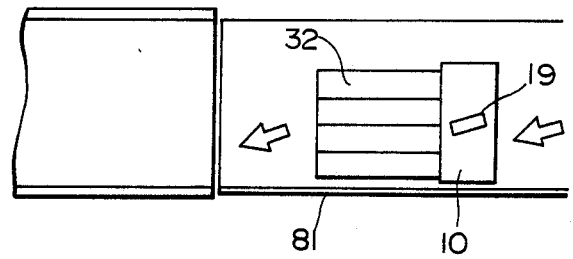
Figure 12:
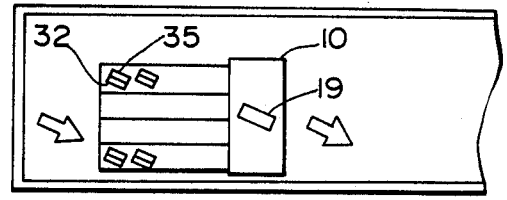

The automated system of the present invention can also be operated to unload a container 90 and pass the cargo over to the conveyor 50, as depicted in the different views of FIG. 11 and FIGS. 12(c) and 12(d). Since most of the unloading steps are substantially similar to the loading procedure detailed above, description will be limited to the parts that are particular to the unloading procedure.

Figure 4:
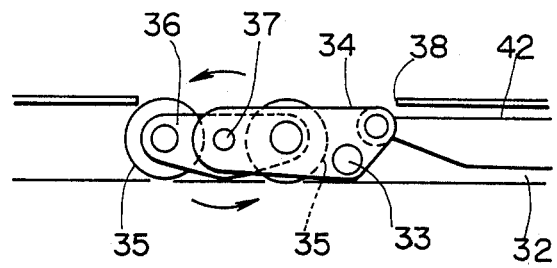
FIG. 4(a) is an enlarged view of the tip of a lift truck's fork and FIGS. 4(b) and 4(c) are respectively views of the fork tip in forward and backward movements.
Figure 4:
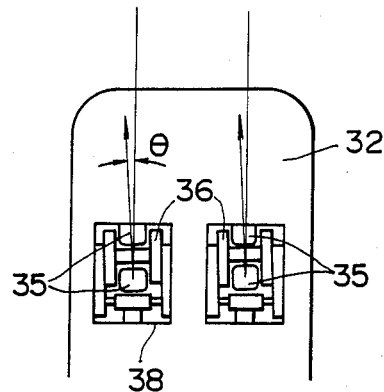
Figure 4:
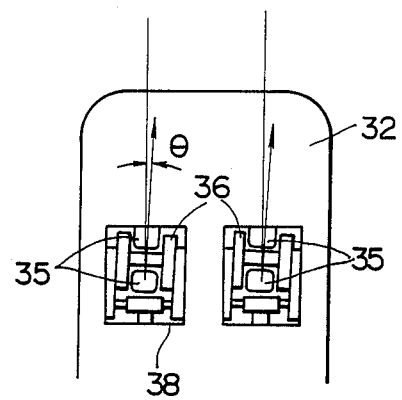

At the outset of unloading operation, the lift truck 10, which may stay standstill on the turntable 60, has its forks 32 raised at their tip, and the bogie frames 36 with the rollers 35 to rotate about their respective pin 37 thorugh 180°. As a result, the rollers stand swiveled to the right as shown in FIG. 4(c).

When a container 90 loaded with cases of cargo 1 is situated in position for unloading, the transport passage 80 is lowered to level flush with the floor 92 of the container 90. The start button on the control panel 130 is pressed to activate the power unit 100 which in turn rotates the turntable 60 through 180°, turning the lift truck 10 thereon until it faces the container 90 as shown in FIG. 11(a).

The lift truck 10 is then caused to move at a low or a high speed toward the container 90, as shown in FIG. 11(b), with the driving wheel 19 swiveled to the left in the drawing. The forks 32 still are held lowered.

As the lift truck 10 moves up the transport passage 80, its guide bar 44 continues to be pressed against the guide rail 81 and the leftside wall of the container 90 so as to guide the movement of the lift truck 10. When the lift truck 10 slows down in front of the loaded cases 1 in the container 90 and comes to a halt when the forks 32 are inserted between the legs 2 of the pallette, the forks 32 are caused to move upward and the bogie frames 36 with the rollers 35 are lowered down to ground, as shown in FIG. 11(c). Then, the driving wheel 19 is driven to cause the lift truck 10 to back out.

When the lift truck 10 moves backward, its guide bar 46 is pressed against the leftside wall of the container 90 and the guide plate 81 since the rollers 35 in the bogie frames 36 are swiveled slightly to the left in FIG. 6 so as to guide the backward movement of the lift truck 10 toward the turntable 60, as shown in FIG. 11(d) and FIG. 12(d). When the lift truck 10 is back in the turntable 60, the latter is rotated through 180° to bring the lift truck 10 to face the conveyor 50, as illustrated in FIG. 11(e). Then, the lift truck 10 is again started to move forward toward the conveyor 50 until the case 1 on the forks 32 comes into abutting contact with the catches 56 where the lift truck is stopped, as depicted in FIG. 11(f). The forks are then lowered to put the case 1 onto the conveyor 50, the step illustrated in FIG. 11(g). Thereafter, the lift truck 10 is caused to back out onto the turntable 60, completing the steps of unloading operation, as shown in FIG. 11(h).

Although the above descriptions refer to loading into and unloading from a container, it should be noted that the present invention is not limited to operation with containers but is likewise applicable with other cargo transporters including a trailer and truck.

Furthermore, although the turntable 60 is driven by the hydraulic cylinder 63 in the illustrated embodiment, it may be operated by any other suitable drive such as an electric motor.

What is claimed is:

1. An automated loading/unloading system having operable traveling lift trucks for loading and unloading cargos, comprising:
    a motor for hydraulically steering a driving wheel in the lift truck;
    a first mechanism for hydraulically moving multiple forks of the lift truck vertically;
    distance sensor means installed at the tip of the forks and at a rear end of the lift truck for determining a cruisable safe distance at both its front and rear;
    pressure sensor means installed in a hydraulic line interconnected to the motor for controlling movement of the lift truck.
    limit sensor means installed in the lift truck for determining upper and lower limits between which the vertical movement of the forks is confined;
    rotational direction sensor means installed in a turntable for determining the direction of rotation and the rotational angle of the turntable;
    the rotatably disposed turntable provided to form part of a transport passage adapted for traveling of the lift truck, the turntable including a second mechanism for hydraulically turning and altering the orientation of the lift truck;
    external drive means having a high-pressure low-delivery pump which provides high-pressure, low-delivery fluid to the motor, the first mechanism and the second mechanism through a directional control valve means and a low-pressure high-delivery pump which provides low-pressure, high-delivery fluid to the motor through a directional control valve means; and
    an external control system which, in accordance with a loading/unloading program, controls the external drive means to actuate the driving wheel, the forks of the lift truck and the turntable in timed relation in response to signals from the distance sensor means, the pressure sensor means, the limit sensor means and the rotational direction sensor means.

2. A system according to claim 1 further comprising a third mechanism being operatively connected to the directional control valve means for causing the rotation of the driving wheel.

3. A system according to claims 1 or 2, further comprising a holder having rotatably disposed rollers at a small angle inclined with respect to a direction of travel of the lift truck, said holder pivotally disposed for rotation about a horizontal axis substantially perpendicular to the direction of movement of the lift truck, and said holder retractably disposed in a fork for moving in and out of a bottom of the fork.

* * * * *